(12) United States Patent
Yamaguchi et al.

(10) Patent No.: US 7,496,752 B2
(45) Date of Patent: Feb. 24, 2009

(54) SYSTEM AND METHOD FOR CONTROLLING COMMUNICATION USING DEVICE ID

(75) Inventors: Keisuke Yamaguchi, Tokyo (JP); Kenjiro Komaki, Saitama (JP); Masaru Masuda, Tokyo (JP); Muneki Shimada, Tokyo (JP); Kanee Kazuhiro, Chiba (JP); Yousuke Kimoto, Kanagawa (JP); Shingo Kannari, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 968 days.

(21) Appl. No.: 10/826,876

(22) Filed: Apr. 16, 2004

(65) Prior Publication Data
US 2004/0233897 A1 Nov. 25, 2004

(30) Foreign Application Priority Data
Apr. 18, 2003 (JP) ............................. 2003-113844

(51) Int. Cl.
*H04L 9/32* (2006.01)
(52) U.S. Cl. ...................... 713/156; 713/155; 726/6; 726/10; 709/223
(58) Field of Classification Search ................ 713/150, 713/155–157, 182–186, 188–189, 161–16, 713/168–170, 21; 726/1–8, 17–19, 10, 21, 726/27–30; 709/203, 229, 223–225
See application file for complete search history.

(56) References Cited

U.S. PATENT DOCUMENTS 6,539,077 B1 * 3/2003 Ranalli et al. .............. 379/67.1

| | | | |
|---|---|---|---|
| 6,823,454 B1 * | 11/2004 | Hind et al. ................... | 713/168 |
| 6,954,790 B2 * | 10/2005 | Forslow ...................... | 709/227 |
| 7,190,948 B2 * | 3/2007 | Donley et al. ............... | 455/411 |
| 7,194,552 B1 * | 3/2007 | Schneider ................... | 709/245 |
| 7,254,390 B2 * | 8/2007 | Coppinger et al. ....... | 455/432.3 |
| 2002/0041605 A1 | 4/2002 | Benussi et al. | |

FOREIGN PATENT DOCUMENTS

JP 11-205335 7/1999

(Continued)

OTHER PUBLICATIONS

Notification of Reason(s) for Refusal dated Apr. 25, 2006, from corresponding Japanese Application 2003-113844.

(Continued)

*Primary Examiner*—Leynna T. Truvan
(74) *Attorney, Agent, or Firm*—Katten Muchin Rosenman LLP

(57) ABSTRACT

A client terminal reads a device ID fixedly assigned to itself, and sends the device ID to an authentication server to make a request for authentication. The authentication server authenticates the device ID accepted from the client terminal. When succeeding in the authentication, the authentication server issues and sends a ticket to the client terminal. The client terminal receives the ticket, and then sends the ticket to a locator server to make a request for registration of an IP address. The locator server verifies the correctness of the accepted ticket. When the correctness is confirmed, the locator server registers an ID and the IP address of the client terminal in a manner that they are associated with each other, and replies the completion of the registration.

11 Claims, 12 Drawing Sheets

FOREIGN PATENT DOCUMENTS

| | | |
|---|---|---|
| JP | 2002-208965 | 7/2002 |
| JP | 2002-239245 | 8/2002 |
| JP | 2002-325086 | 11/2002 |
| JP | 2003-076714 | 3/2003 |
| WO | WO 02/052784 | 7/2002 |

OTHER PUBLICATIONS

International Preliminary Examination Report dated Aug. 2, 2005.
Decision of Refusal dated Jul. 18, 2006, from corresponding Japanese Application 2003-113844.
International Search Report dated Jul. 28, 2004.
Written Opinion of the International Searching Authority.
Guido Appenzeller, et al. User-Friendly Access Control for Public Network Ports. IEEE 1999 pp. 699-707.
B. Clifford Neuman. Proxy-Based Authorization and Accounting for Distributed Systems. IEEE 1993, pp. 283-291.
Japanese Office Action dated Jun. 3, 2005 from the corresponding Japanese Application No. 2003-113844.

* cited by examiner

| LOCATOR ID 400 | IP ADDRESS 402 | REGISTRATION TIME 404 |
|---|---|---|
| 0001 | XXX.XXX.XXX.XXX | 2003/01/01 09:52:15 |
| 0002 | XXX.XXX.XXX.XXX | 2003/01/01 10:12:52 |
| ⋮ | ⋮ | ⋮ |

FIG.10

| LOCATOR ID (400) | IP ADDRESS (402) | REGISTRATION TIME (404) | GROUP ID (408) |
|---|---|---|---|
| 0001 | XXX.XXX.XXX.XXX | 2003/01/01 09:52:15 | 0003 |
| 0002 | XXX.XXX.XXX.XXX | 2003/01/01 10:12:52 | — |
| ⋮ | ⋮ | ⋮ | ⋮ |

| GROUP ID | NUMBER OF MEMBERS | LOCATOR ID | LOCATOR ID | LOCATOR ID | ... |
|---|---|---|---|---|---|
| 0001 | 2 | 0110 | 0053 | — | ... |
| 0002 | 4 | 0002 | 1594 | 3258 | ... |
| .. | .. | .. | .. | .. | .. |

| LOCATOR ID 400 | IP ADDRESS 402 | REGISTRATION TIME 404 | MEDIUM ID 406 | COMMUNITY FLAG 410 | NICKNAME 412 | NETWORK MODE 414 |
|---|---|---|---|---|---|---|
| 0001 | xxx.xxx.xxx.xxx | 2003/01/01 09:52:15 | 525.320 | 1 | AAA | YES |
| 0002 | xxx.xxx.xxx.xxx | 2003/01/01 10:12:52 | 072.752 | 4 | BBB | NO |
| .. | .. | .. | .. | .. | .. | .. |

242

SYSTEM AND METHOD FOR CONTROLLING COMMUNICATION USING DEVICE ID

BACKGROUND OF THE INVENTION

1. Field of the Invention

The present invention relates to a communication management technology, and especially relates to a technology for managing communication over a network between terminals.

2. Description of the Related Art

By the widespread use of communication environment using the Internet, it has become possible for a user of a terminal such as a personal computer and the like to casually enjoy communicating with another user over the Internet. A specialized game machine adapted to network connection is also widely used, and hence the user has been able to play a versus game and the like with other users over the Internet.

To carry out communication over the Internet, a terminal is identified by use of an IP (Internet Protocol) address, which is uniquely assigned to each terminal. Under present circumstances, most of the users connect to an Internet Service Provider (ISP) through a public network, and connect to the Internet with the use of IP addresses assigned by the ISP. The IP address assigned by the ISP is generally unfixed, and is dynamically assigned whenever connection is made.

A user cannot directly communicate with a terminal of a certain user over the Internet without knowing an IP address assigned to the terminal, even if he/she knows a device ID which is uniquely and fixedly assigned to the terminal. Thus, in the case of communicating with the terminal the IP address of which is dynamically assigned, it is necessary to get the IP address assigned thereto whenever communication is made.

SUMMARY OF THE INVENTION

In view of such a situation described above, an object of the present invention is to provide a technology for improving the convenience of communication over a network between terminals.

One aspect of the present invention relates to a communication management system. The communication management system comprises a terminal of a user, an authentication server which authenticates the terminal, and a management server which manages network addresses which uniquely identify the terminals on a network. The terminal comprises a holding unit, an authentication request unit, a certificate acquisition unit, and a registration request unit. The holding unit holds a device ID which is specifically assigned to each terminal in such a manner as to uniquely identify the terminal. The authentication request unit reads the device ID from the holding unit, and sends the device ID to the authentication server to make a request for authentication. The certificate acquisition unit acquires a certificate, which certifies success in the authentication, from the authentication server. The registration request unit sends the certificate to the management server, to make a request for registration of the network address, which is assigned to the own terminal. The authentication server comprises an authentication reception unit, an authentication unit, and a certificate issue unit. The authentication reception unit acquires the device ID from the terminal and receives the request for the authentication. The authentication unit authenticates the correctness of the device ID of the terminal. The certificate issue unit issues a certificate when succeeding in the authentication of the terminal. The management server comprises a database, a registration reception unit, a registration unit, an inquiry reception unit, a search unit, and an answer unit. The database holds an ID, uniquely identifying the terminal, and the network address in such a manner that they are associated with each other. The registration reception unit acquires the certificate from the terminal, and receives the request for registration of the network address of the terminal. The registration unit verifies the correctness of the certificate, and registers the ID and the network address of the terminal in the database when the certificate is confirmed to be correct. The inquiry reception unit receives the request for inquiring the network address of the terminal. The search unit searches through the database on the basis of the ID of the terminal as the target of an inquiry, to acquire the network address of the terminal. The answer unit answers search result.

The network may be, for example, the Internet, a LAN, a WAN, and the like. In the case of the Internet, for example, the network address may be an IP address. The device ID may be stored in ROM (Read Only Memory), which is provided inside the terminal and un-rewritable from outside, during manufacturing the terminal.

The authentication server may further comprise an ID issue unit, which issues an ID for uniquely identifying the terminal when succeeding in the authentication of the terminal. The management server may further comprise a group database for holding information related to a group which includes the plurality of terminals. The inquiry reception unit may receive a request for an inquiry about the group, and the search unit may search through the group database on the basis of the request for the inquiry. The management server may further comprise a matching control unit which controls matching of a communication partner between the terminals. The inquiry reception unit may receive a requirement for the communication partner, and the search unit may search through the database on the basis of the requirement. The matching control unit may determine the communication partner on the basis of search result, and the answer unit may answer the communication partner.

A series of processes from that the terminal reads the device ID to make the request for authentication, to that the network address of the terminal is stored in the database of the management server, may be automatically carried out without involvement by the user.

It is to be understood that any combinations of the foregoing components, and expressions of the present invention having their methods, apparatuses, systems, recording media, computer programs, and the like converted mutually are also intended to constitute applicable aspects of the present invention.

BRIEF DESCRIPTION OF THE DRAWINGS

FIG. 10 is a table showing an example of internal data in a user database according to the second embodiment;

FIG. 11 is a table showing an example of internal data in a group database according to the second embodiment;

FIG. 13 is a table showing an example of internal data in a user database according to the third embodiment.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

First Embodiment

Figure 1:
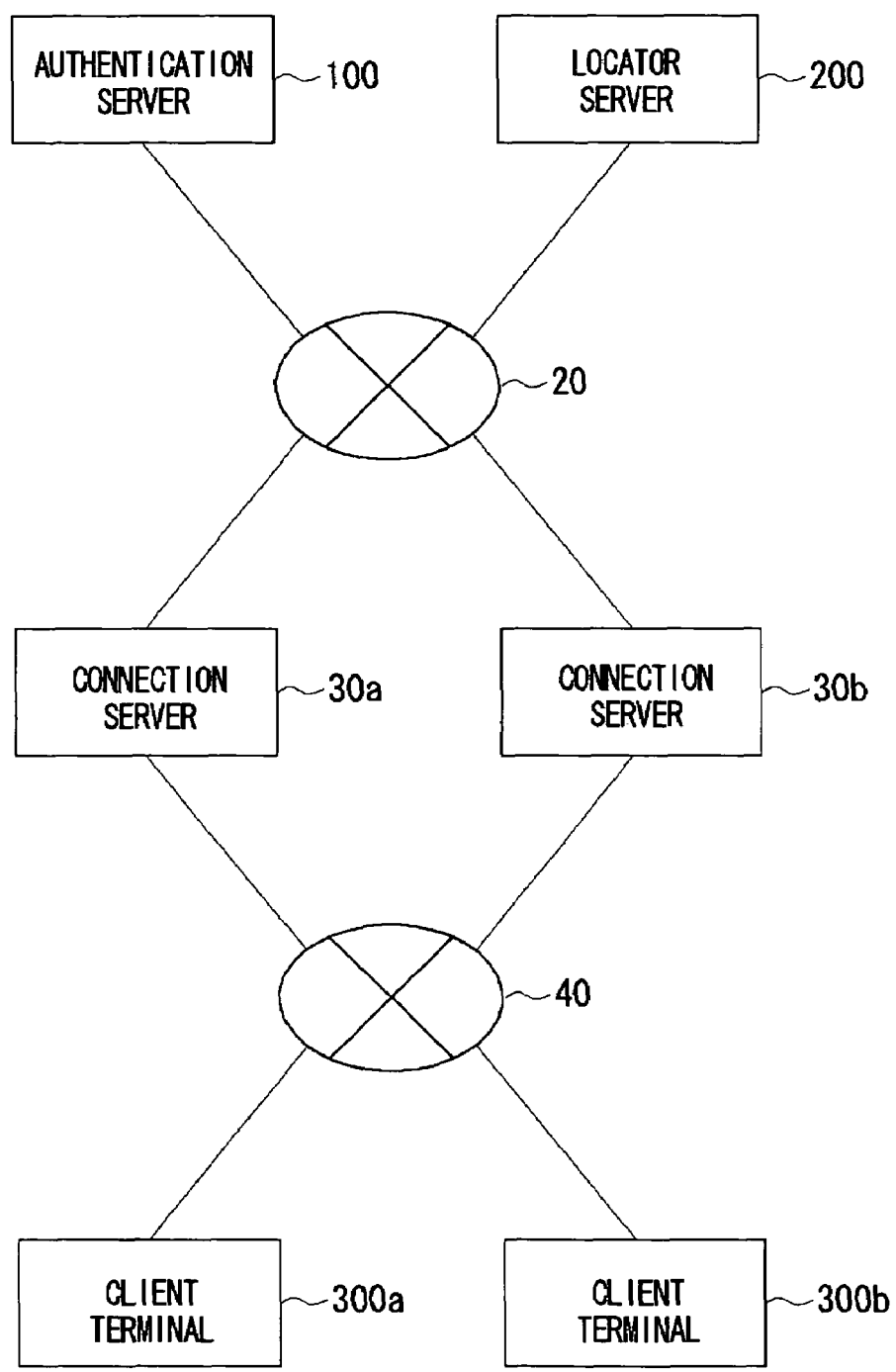
FIG. 1 is a block diagram showing the whole structure of a communication management system according to a first embodiment.

FIG. 1 shows the whole structure of a communication management system 10 according to a first embodiment. In the communication management system 10, an authentication server 100 for authenticating client terminals 300, and a locator server 200 as an example of a management server for managing the IP addresses of the client terminals 300 are connected to the Internet 20 as an example of a network. The client terminals 300a and 300b used by users are connected to connection servers 30a and 30b of an internet service provider via a public network 40, respectively. The connection servers 30a and 30b mediate connection to the Internet 20. Thereby, the client terminals 300a and 300b are connected to the Internet 20 via the connection servers 30a and 30b.

In this embodiment, the IP address of the client terminal 300a authenticated by the authentication server 100 is registered in the locator server 200, in order to make communication possible over the Internet 20 between the client terminals 300a and 300b. The IP addresses of the client terminals 300a and 300b are dynamically assigned by the connection servers 30a and 30b. When the client terminal 300b makes a request of the locator server 200 to inquire about the IP address of the client terminal 300a, the locator server 200 replies the IP address of the client terminal 300a to the client terminal 300b. Thus, the client terminal 300a can disclose the own IP address, which is dynamically assigned to itself, to another client terminal 300b. The client terminal 300b can acquire the IP address dynamically assigned to the client terminal 300a as a communication partner, and communicate with the client terminal 300a on the Internet 20.

In this embodiment, when the authentication server 100 authenticates the client terminal 300, the authentication server 100 accepts a device ID and verifies the correctness thereof, instead of verifying the combination of an ID and a password accepted from the client terminal 300 as with an ordinary case. The device ID is uniquely assigned to each client terminal 300 and held in a tamperproof manner. Thus, the user is released from the inconvenience of remembering the ID and the password, and from the time and effort of inputting them in authentication, with ensuring sufficient security. Since this method requires no involvement by the user, it is also possible that the client terminal 300 automatically accesses the authentication server 100 to make a request for authentication. Furthermore, it is also possible to automate the process for registering the IP address in the locator server 200 after the authentication, in a like manner. Thus, a series of authentication process and registration process can be automatically carried out without involvement by the user, when the client terminal 300 is activated, or when the client terminal 300 is connected to the Internet 20 and the IP address is assigned thereto. Therefore, process that the client terminal 300 registers the IP address in the locator server 200 is completed without making the user aware, so that it is possible to further improve the convenience of the user.

To realize the foregoing authentication method, in this embodiment, only a device, to which a device ID administered by the authentication server 100 is assigned, is available as the client terminal 300 allowed to be registered in the locator server 200. In other words, only a device, which is assured that its device ID is unique and held in a tamperproof manner, is authenticated and allowed to be registered in the locator server 200. A device without assurances of the uniqueness and correctness of its device ID is refused to be registered in the locator server 200. Thus, it is prevented that an IP address of the client terminal 300 cannot be specified because the ID of the client terminal 300 registered on the locator server 200 is the same as the ID of other client terminal 300. Furthermore, it is prevented that a mala fide third party carries out communication with disguising himself/herself as another client terminal 300. To prevent the leakage and tampering of the device ID, the device ID may be coded when the client terminal 300 sends its device ID to the authentication server 100. Otherwise, a digital sign may be attached to the device ID. Therefore, it is possible to further improve security.

Figure 2:
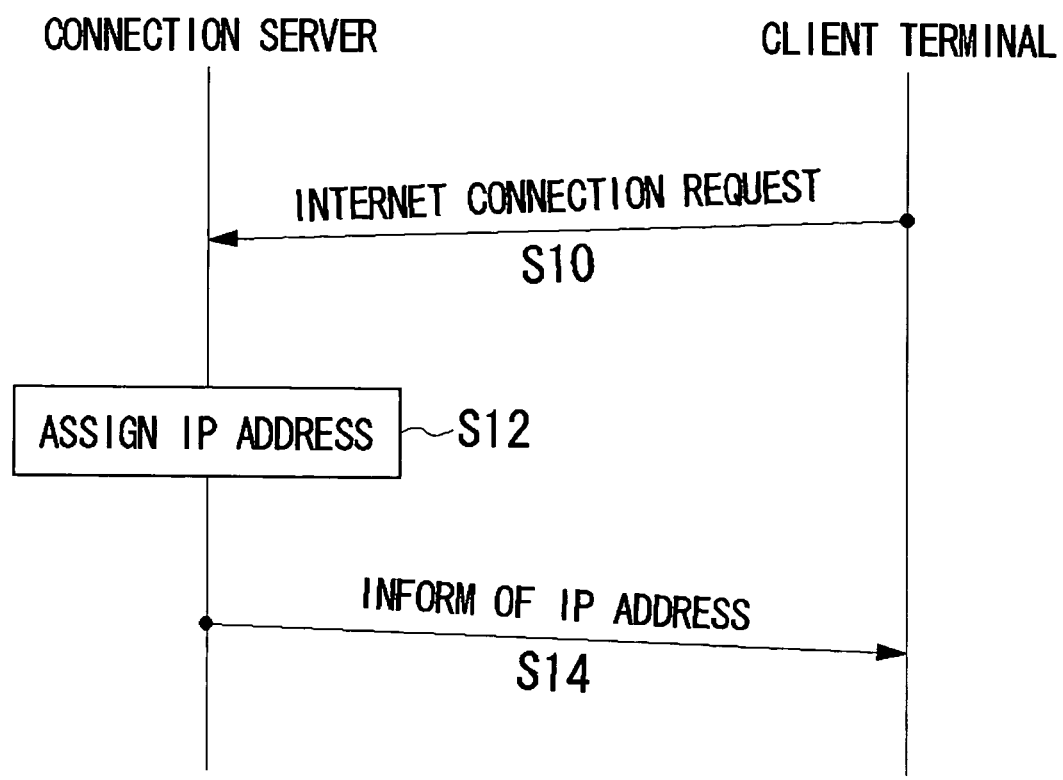
FIG. 2 is a sequence diagram which shows a schematic procedure for assigning an IP address to a client terminal in the communication management system.

FIG. 2 is a sequence diagram which shows a schematic procedure for assigning an IP address to the client terminal 300a in the communication management system 10. First, the client terminal 300a requires the connection server 30a to connect the client terminal 300a to the Internet 20 (S10). The connection server 30a selects one of IP addresses, which are not assigned to the other terminals, and assigns it to the client terminal 300a (S12). Then, the connection server 30a informs the client terminal 300a of the assigned IP address (S14). The client terminal 300a carries out communication on the Internet 20 by use of the assigned IP address. It changes whenever connection is made that which IP address is assigned to the client terminal 300a, out of the IP addresses administered by the connection server 30a. Thus, the IP address of the client terminal 300a changes whenever connection is made.

Figure 3:
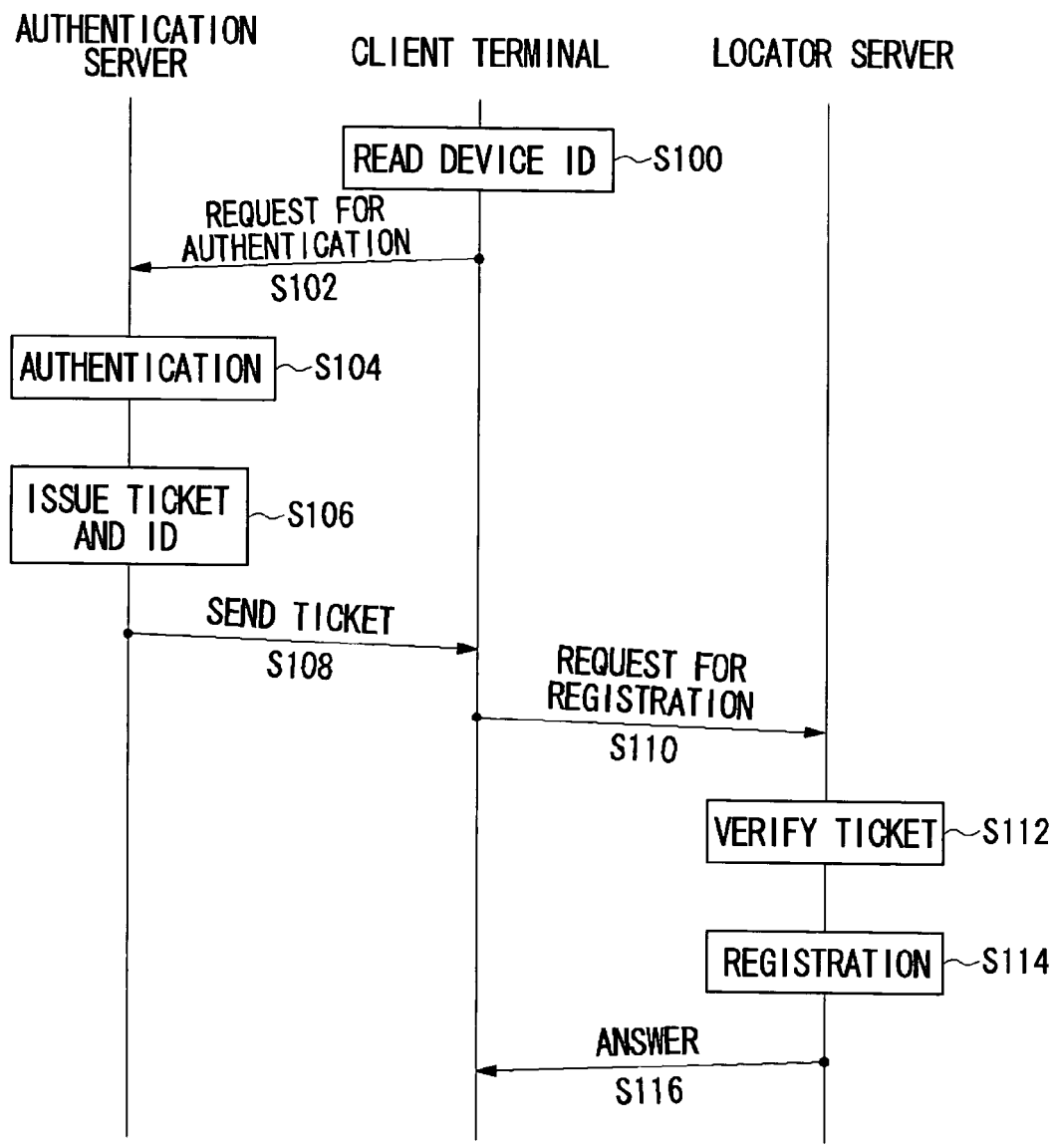
FIG. 3 is a sequence diagram which shows a schematic procedure for registering the IP address of the client terminal on a locator server in the communication management system.

FIG. 3 is a sequence diagram which shows a schematic procedure for registering the IP address of the client terminal 300a in the locator server 200 in the communication management system 10. First, the client terminal 300a reads the device ID fixedly assigned to itself (S100), and sends the device ID to the authentication server 100 to require authentication (S102). The device ID is a specific ID which can uniquely identify each client terminal 300. The device ID is stored in nonvolatile memory, which is provided in the client terminal 300 and is un-rewritable from outside, and is kept in a tamperproof manner. The authentication server 100 authenticates the device ID accepted from the client terminal 300a (S104). Succeeding in authentication, the authentication server 100 issues a ticket used when the client terminal 300a registers its IP address in the locator server 200, and an ID (hereafter called "locator ID") for uniquely identifying the client terminal 300a (S106). Then, the authentication server 100 sends the ticket and the locator ID to the client terminal 300a (S108). This ticket is a certificate for certifying success in the authentication of the terminal. To prevent fraudulent forgery, for example, a digital sign of the authentication server 100 may be attached to the ticket. To prevent leakage into a third party, for example, the ticket may be coded by a public key of the locator server 200. The locator ID is used for uniquely identifying the client terminal 300 in the locator server 200. The locator ID may be the translation of the device ID in accordance with a predetermined rule, and the same locator ID may be fixedly issued to the same client terminal 300.

The device ID may be used for identifying the client terminal 300 in the locator server 200. The device ID, however, is the extremely important information which is used for the authentication of the client terminal 300, so that it is avoided to inform the locator server 200 of the device ID in this embodiment. The locator server 200 identifies the client terminal 300 by the locator ID, which is issued by the authentication server 100. Therefore, it is possible to minimize the danger of the leakage of the device ID.

Upon receiving the ticket from the authentication server 100, the client terminal 300a sends the ticket and the IP address assigned to itself to the locator server 200, in order to make a request for registration of the IP address (S110). The locator ID and the IP address of the client terminal 300a, and information indicating the correctness thereof are sent to the locator server 200. In this embodiment, the ticket includes the locator ID of the client terminal 300a. The locator server 200 verifies the correctness of the ticket received from the client terminal 300a (S112). In confirming the correctness, the locator ID and the IP address of the client terminal 300a are registered in the locator server 200 in a manner that they are associated with each other (S114). Then, the locator server 200 replies the completion of registration to the client terminal 300a (S116). The client terminal 300a, as described above, may automatically carry out the series of procedures like above without the medium of directions by the user.

Figure 4:
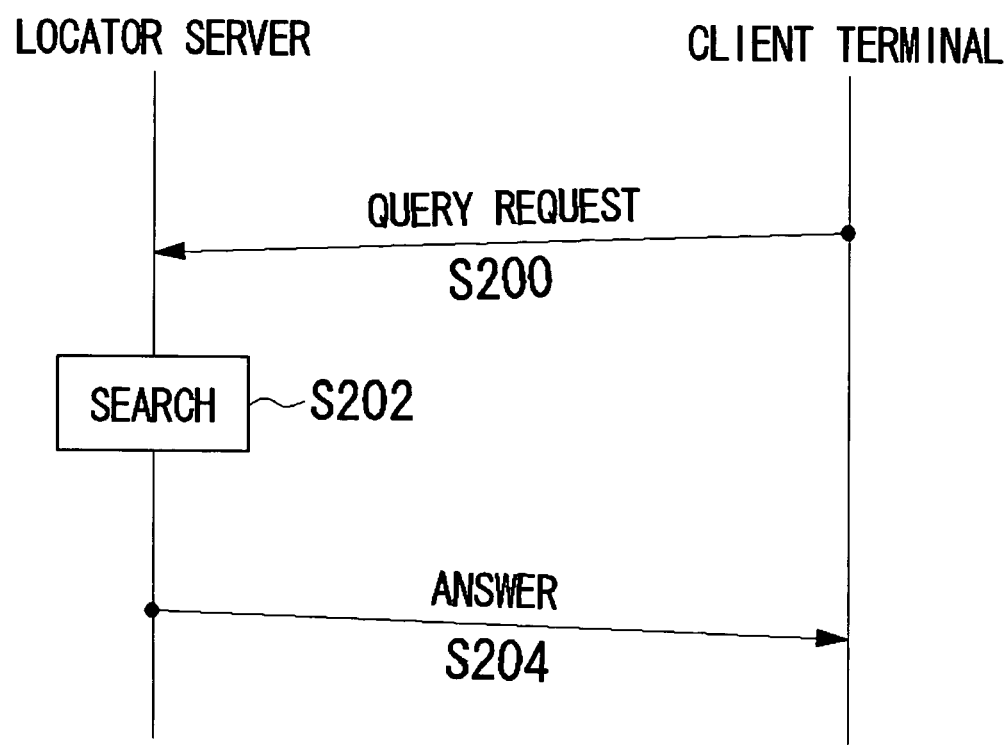
FIG. 4 is a sequence diagram which shows a schematic procedure for inquiring of the locator server about the IP address of the client terminal in the communication management system.

FIG. 4 is a sequence diagram which shows a schematic procedure for inquiring of the locator server 200 about the IP address of the client terminal 300a in the communication management system 10. The client terminal 300b as the inquirer sends the locator ID of the client terminal 300a as the target of inquiry to the locator server 200, in order to request the inquiry about the IP address of the client terminal 300a (S200). The locator server 200 searches for the IP address of the client terminal 300a on the basis of the locator ID of the client terminal 300a received by the client terminal 300b (S202), and replies search result to the client terminal 300b (S204). Thus, the client terminal 300b can get the IP address of the client terminal 300a as the communication partner by memorizing the locator ID of the client terminal 300a, even if the IP address thereof is dynamically changed. Therefore, the client terminal 300b can communicate with the client terminal 300a on the Internet 20.

Figure 5:
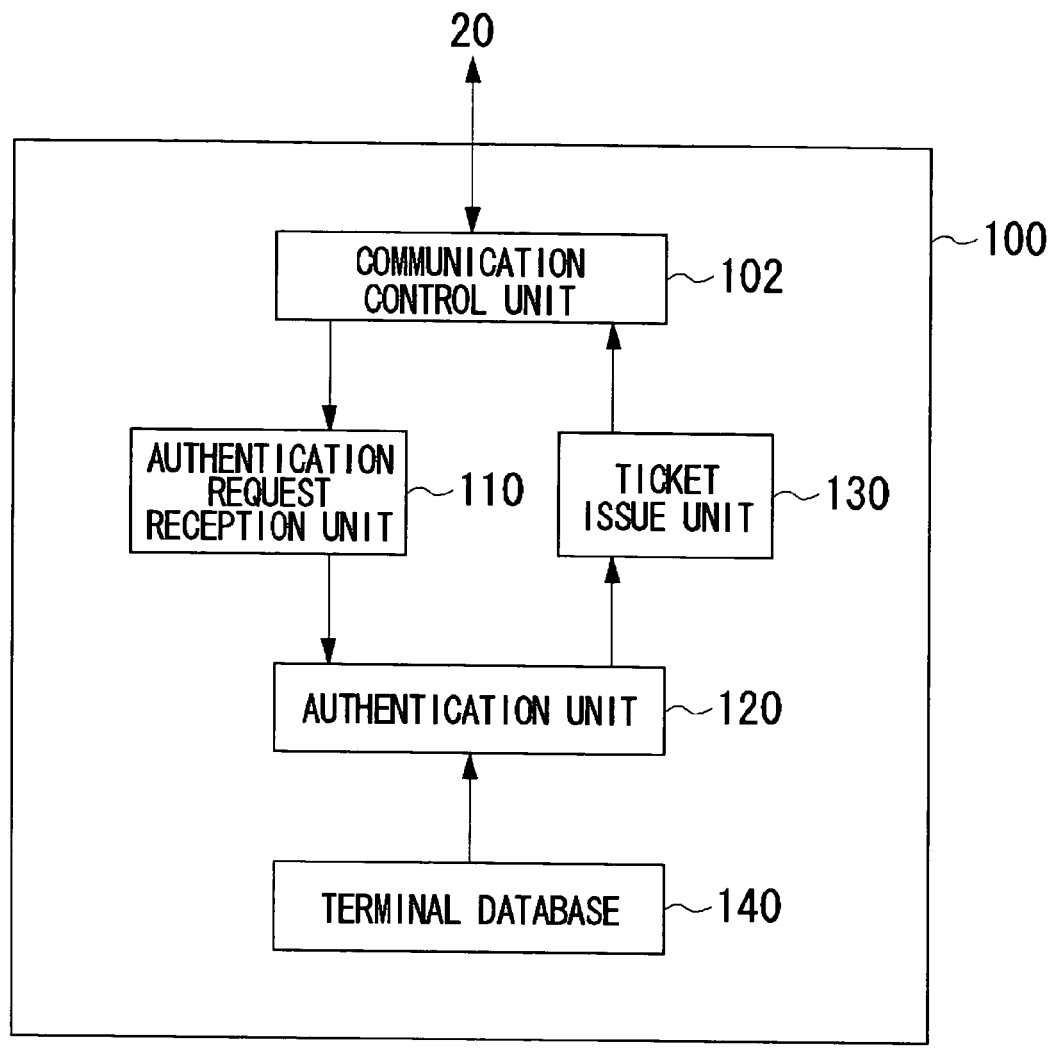
FIG. 5 is a block diagram showing the internal structure of an authentication server according to the first embodiment.

FIG. 5 shows the internal structure of the authentication server 100. This structure is realized by a CPU, a memory, and other LSI of an arbitrary computer in hardware, and by a program loaded to the memory and the like in software, but function blocks realized by the conjunction of them are illustrated in FIG. 5. Accordingly, those skilled in the art will realize that these function blocks are realized by various forms, such as only hardware, only software, or combination thereof. The authentication server 100 comprises a communication control unit 102, an authentication request reception unit 110, an authentication unit 120, a ticket issue unit 130, and a terminal database 140.

The communication control unit 102 controls communication with other devices on the Internet 20. The terminal database 140 stores the device ID of the client terminal 300 to be authenticated. The terminal database 140 may be acquired from a maker of the client terminal 300, in other words, an entity which provided the client terminal 300 with the device ID. The authentication request reception unit 110 accepts the request for authentication from the client terminal 300. At this time, the authentication request reception unit 110 acquires the device ID of the client terminal 300 as the source of request. The authentication unit 120 authenticates whether the acquired device ID is coincident with the device ID of the client terminal 300 which can receive service by this communication management system 10 or not, with reference to the terminal database 140. In the case of failing in the authentication, failure in the authentication is responded to the client terminal 300 through the communication control unit 102. In the case of succeeding in the authentication, the ticket issue unit 130 issues the ticket to certify success in the authentication, and the locator ID. Namely, the ticket issue unit 130 also functions as an ID issue unit. The issued ticket and the locator ID are sent to the client terminal 300 through the communication control unit 102.

Figure 6:
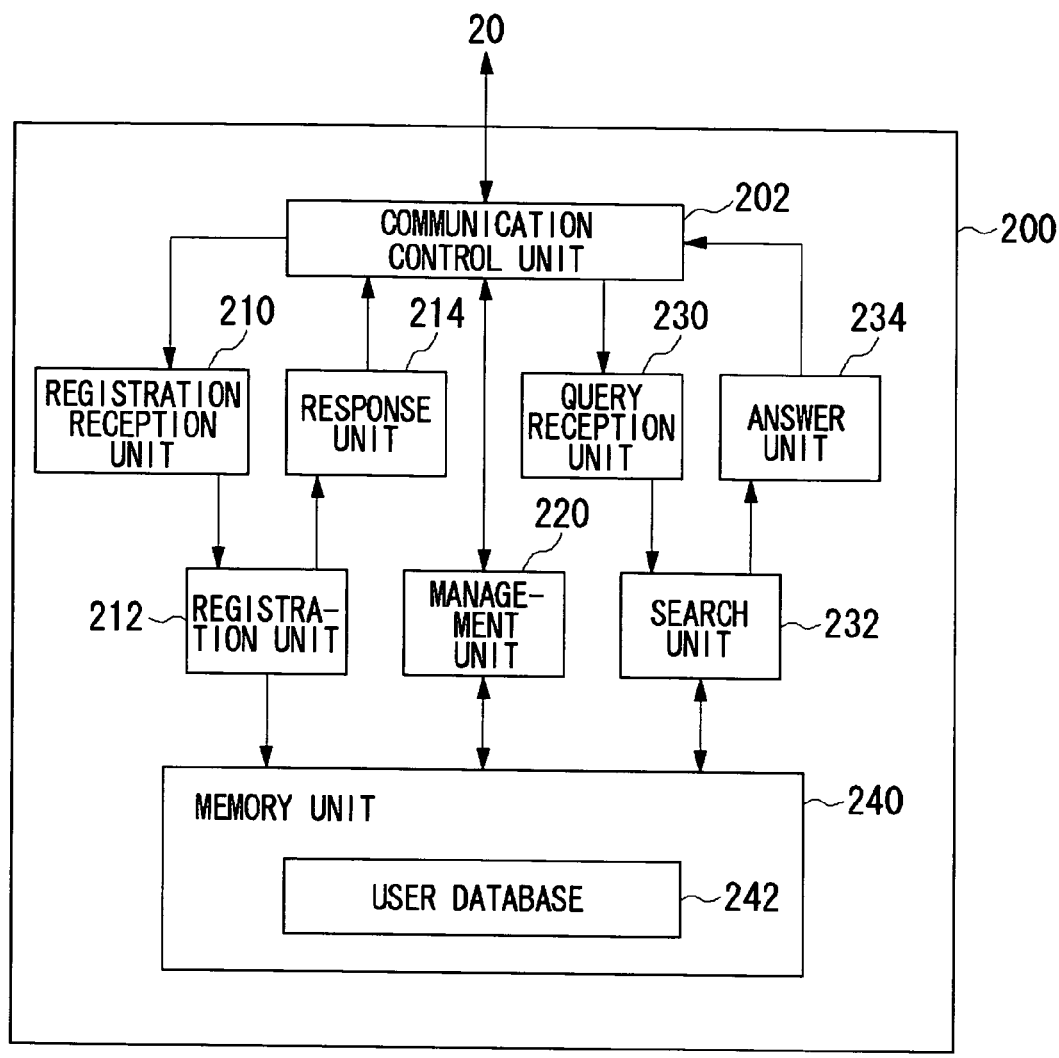
FIG. 6 is a block diagram showing the internal structure of the locator server according to the first embodiment.

FIG. 6 shows the internal structure of the locator server 200. This structure is also realized by various forms, with the use of only hardware, only software, or combination thereof. The locator server 200 comprises a communication control unit 202, a registration reception unit 210, a registration unit 212, a response unit 214, a management unit 220, a query reception unit 230, a search unit 232, an answer unit 234, and a memory unit 240 in which a user database 242 is stored.

Figures 7, 8:
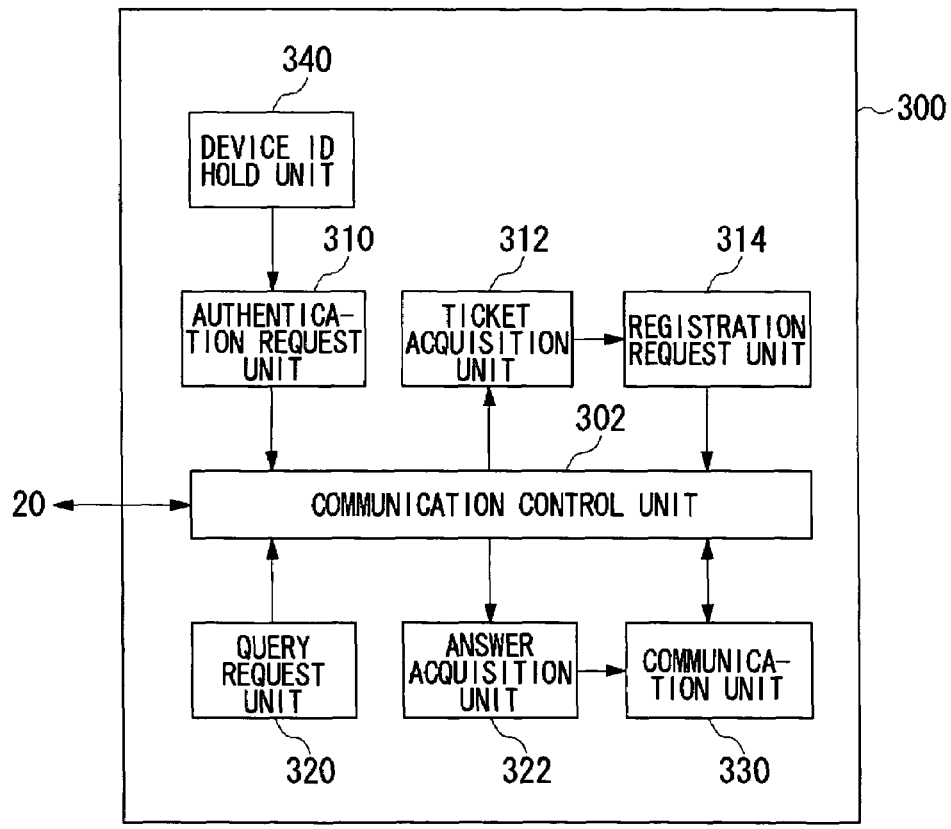
FIG. 7 is a table showing an example of internal data in a user database according to the first embodiment.
FIG. 8 is a block diagram showing the internal structure of the client terminal according to the first embodiment.

The communication control unit 202 controls communication with other devices on the Internet 20. The user database 242 stores information related to the client terminal 300 registered in the locator server 200. FIG. 7 shows an example of internal data of the user database 242. The user database 242 is provided with a locater ID field 400, an IP address field 402, and a registration time field 404. The locator ID and the IP address of the client terminal 300 are held in the user database 242 in a manner that they are associated with each other. The registration time field 404, as described later, is used for administering the expiration time of the registered IP address.

The registration reception unit 210 receives the request for registering the IP address from the client terminal 300. At this time, the registration reception unit 210 acquires the locator ID and the ticket of the client terminal 300 as the source of request. The registration unit 212 verifies the correctness of the acquired ticket. When the correctness of the ticket is confirmed, the registration unit 212 registers the locator ID and the IP address of the client terminal 300 as the source of the request in the user database 242 in a manner that they are associated with each other. Then, the response unit 214 responds success in registration to the client terminal 300. When the correctness of the ticket is not confirmed, the response unit 214 responds failure in the registration to the client terminal 300.

The query reception unit 230 receives the request for inquiring about the IP address from the client terminal 300. At this time, the query reception unit 230 acquires the locator ID of the client terminal 300 as the target of inquiry. The search unit 232 searches through the user database 242 for the locator ID of the client terminal 300 as the target of inquiry, to acquire the IP address presently assigned to the client terminal 300. At this time, the search unit 232 may judge that the IP address of the client terminal 300, which is not updated for a predetermined time period or more since registration, is invalid with reference to the registration time field 404, because there is a possibility that such a client terminal 300 have been already disconnected from the Internet 20. The answer unit 234 replies search result by the search unit 232 to the client terminal 300.

The query reception unit 230 may receive an inquiry whether the client terminal 300 is being connected to the Internet 20 or not. In this case, the search unit 232 searches for whether or not the locator ID of the client terminal 300 is registered in the user database 242. When the locator ID is registered, the answer unit 234 replies that the client terminal 300 is online. When the locator ID is not registered, the answer unit 234 replies that the client terminal 300 is offline.

The management unit 220 manages the expiration time of the IP address registered in the user database 242. After the client terminal 300 registered in the user database 242 is disconnected from the Internet 20 by turning power off and the like, if the information of the client terminal 300 remains in the user database 242, wrong information is replied to another client terminal 300. To avoid such a situation, for example, the client terminal 300 may be repeatedly registered in the locator server 200 at predetermined intervals, while the client terminal 300 is connected to the Internet 20. In this case, the management unit 220 refers to the registration time field 404 of the user database 242, and deletes the record of the client terminal 300 which has not been updated for a predetermined time period or more. The management unit 220 may inquire of the client terminal 300 whether the client terminal 300 is connected to the Internet 20 and the IP address is unchanged from registered one or not, after a lapse of predetermined time from the registration date.

FIG. 8 shows the internal structure of the client terminal 300. This structure is also realized by various forms, with the use of only hardware, only software, or combination thereof. The client terminal 300 comprises a communication control unit 302, an authentication request unit 310, a ticket acquisition unit 312, a registration request unit 314, a query request unit 320, an answer acquisition unit 322, a communication unit 330, and a device ID hold unit 340.

The communication control unit 302 controls communication with other devices on the Internet 20. To connect with the Internet 20, the communication control unit 302 sends a connection request to the connection server 30 through the public network 40, and acquires an IP address provided by the connection server 30. From then on, the communication control unit 302 carries out communication on the Internet 20 by use of this IP address. The device ID hold unit 340, being non-volatile memory such as ROM and the like which is un-rewritable from outside, holds the specific device ID which can uniquely identify each client terminal 300. The device ID, written in the device ID hold unit 340 during manufacturing the client terminal 300, is administered in a tamperproof manner from then on.

The authentication request unit 310 reads the own device ID from the device ID hold unit 340, and sends the device ID to the authentication server 100 to request the authentication. The ticket acquisition unit 312 acquires the ticket which the authentication server 100 issues in authenticating the client terminal 300, and the locator ID issued by the authentication server 100. The registration request unit 314 sends the acquired ticket to the locator server 200 to request for registering the own IP address.

Before carrying out communication with another client terminal 300 on the Internet 20, the query request unit 320 makes a request of the locator server 200 to inquire about the IP address of that client terminal 300. The query request unit 320 may inquire of the locator server 200 about the online status of another client terminal 300. The answer acquisition unit 322 acquires an answer from the locator server 200. The communication unit 330 carries out communication with the client terminal 300, with the use of the IP address of the client terminal 300 as the target of communication acquired from the locator server 200. Thus, since the client terminals 300 can communicate with each other on the Internet 20, it is possible to realize, for example, IP telephone, a network game, and the like.

According to the communication management system 10 of this embodiment, as described above, even if the IP address of the client terminal 300 changes, it is possible to communicate with the client terminal 300 on the Internet 20 by acquiring the IP address of the client terminal 300 as the target of communication. In a case where the maker of the client terminal 300 manages this communication management system 10, the maker can administer the device IDs of all client terminals 300, so that it is possible to overall register the IP addresses of all client terminals 300 and accept the inquiries about them. Therefore, an individual service provider of a game and the like using the communication between the terminals does not need to provide the communication management system 10 according to this embodiment, and hence both the user and the service provider have significant advantage.

It is preferable that the maker of the client terminal 300 manages the authentication server 100 from the viewpoint of securing the confidentiality of the device ID, but the locator server 200 may be managed by the service provider. A plurality of service providers may provide a plurality of locator servers 200. The authentication server 100 requires extremely high security in order to prevent the leakage of the device ID. However, as described above, since the device ID is not informed to the locator server 200, and the locator server 200 identifies the client terminal 300 by the locator ID, the locator server 200 may be managed at lower security level than the authentication server 100. Therefore, it is possible to reduce cost necessary for the installation and management of the locator server 200. Providing the locator server 200, which accepts the query requests from an indefinite number of client terminals 300, separately from the authentication server 100 makes it possible to improve the security of the authentication server 100, and to prevent the leakage of the device ID.

Second Embodiment

A second embodiment will describe a communication management system 10 which can manage a plurality of users with grouping. The whole structure of the communication management system 10 according to this embodiment is the same as that of the communication management system 10 of the first embodiment shown in FIG. 1. The internal structures of an authentication server 100 and a client terminal 300 according to this embodiment are the same as those of the first embodiment shown in FIGS. 5 and 8, respectively.

Figure 9:
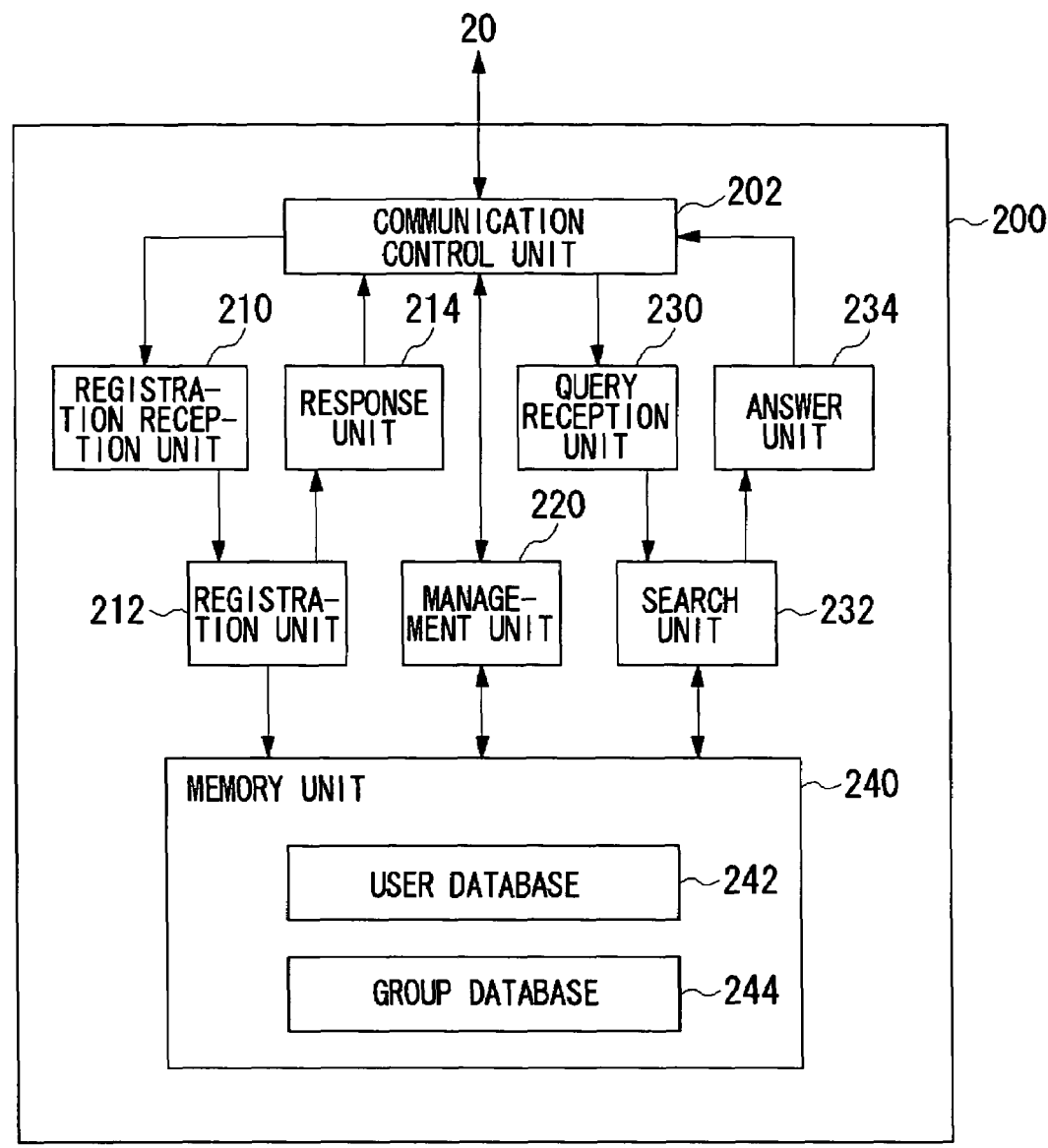
FIG. 9 is a block diagram showing the internal structure of a locator server according to a second embodiment.

FIG. 9 shows the internal structure of a locator server 200 according to this embodiment. The locator server 200 according to this embodiment is provided with a group database 244, in addition to the structure of the locator server 200 according to the first embodiment shown in FIG. 6. The other structure is the same as that of the first embodiment, and the same reference numbers are used for the same structure. Difference from the first embodiment will be mainly described in what follows.

Figure 11:
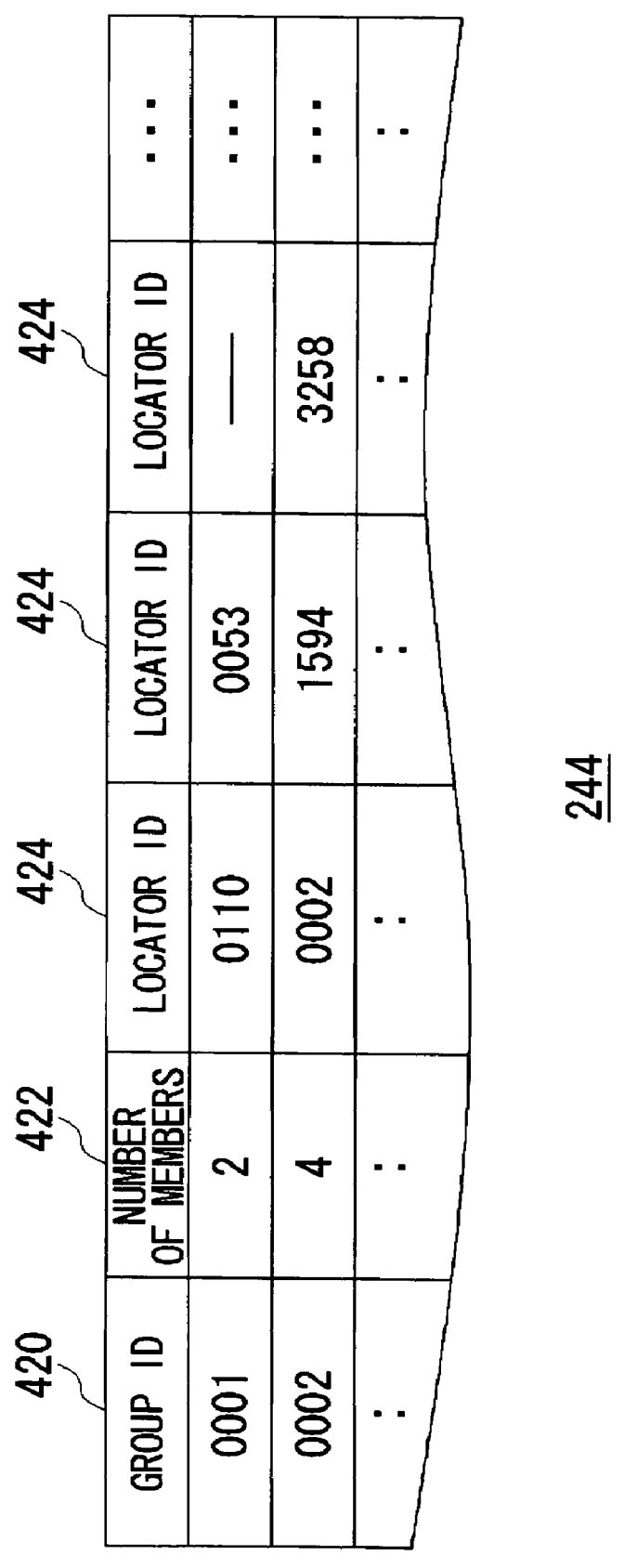

FIG. 10 shows an example of internal data of the user database 242 according to this embodiment. The user database 242 according to this embodiment is provided with a group ID field 408, in addition to the internal data of the user database 242 according to the first embodiment shown in FIG. 7. An ID of a group, to which the user belongs, is stored in the group ID field 408. FIG. 11 shows an example of internal data of the group database 244. The group database 244 is provided with a group ID field 420, a member's number field 422, and locator ID fields 424. The number of members composing the group is stored in the member's number field 422. There are locator ID fields 424 of the same number as the members, and a locator ID of a client terminal 300 of the member composing the group is stored in each locator ID field 424.

The registration reception unit 210 further acquires the information of the group to which the user belongs, in receiving registration from the client terminal 300. The registration unit 212 registers the received information on the user database 242 and the group database 244. In a case where the group has not been registered, the registration unit 212 newly registers the group on the group database 244. The query reception unit 230 receives a request for an inquiry about the group. Taking the case of accepting an inquiry about the IP addresses of members who belong to a group with a group ID "0001," for example, the search unit 232 searches through the group database 244 to acquire the locator IDs of the members who belong to the group with the group ID "0001." Then, the search unit 232 searches through the user database 242 to acquire the IP address of each member. The answer unit 234 replies the IP address of each member. According to the foregoing structure, it is possible to manage the users with grouping.

Third Embodiment

A third embodiment will describe a communication management system 10 which can match communication partners between terminals. The whole structure of the communication management system 10 according to this embodiment is the same as the communication management system 10 of the first embodiment shown in FIG. 1. The internal structures of an authentication server 100 and a client terminal 300 according to this embodiment are the same as those of the first embodiment shown in FIGS. 5 and 8, respectively.

Figure 12:
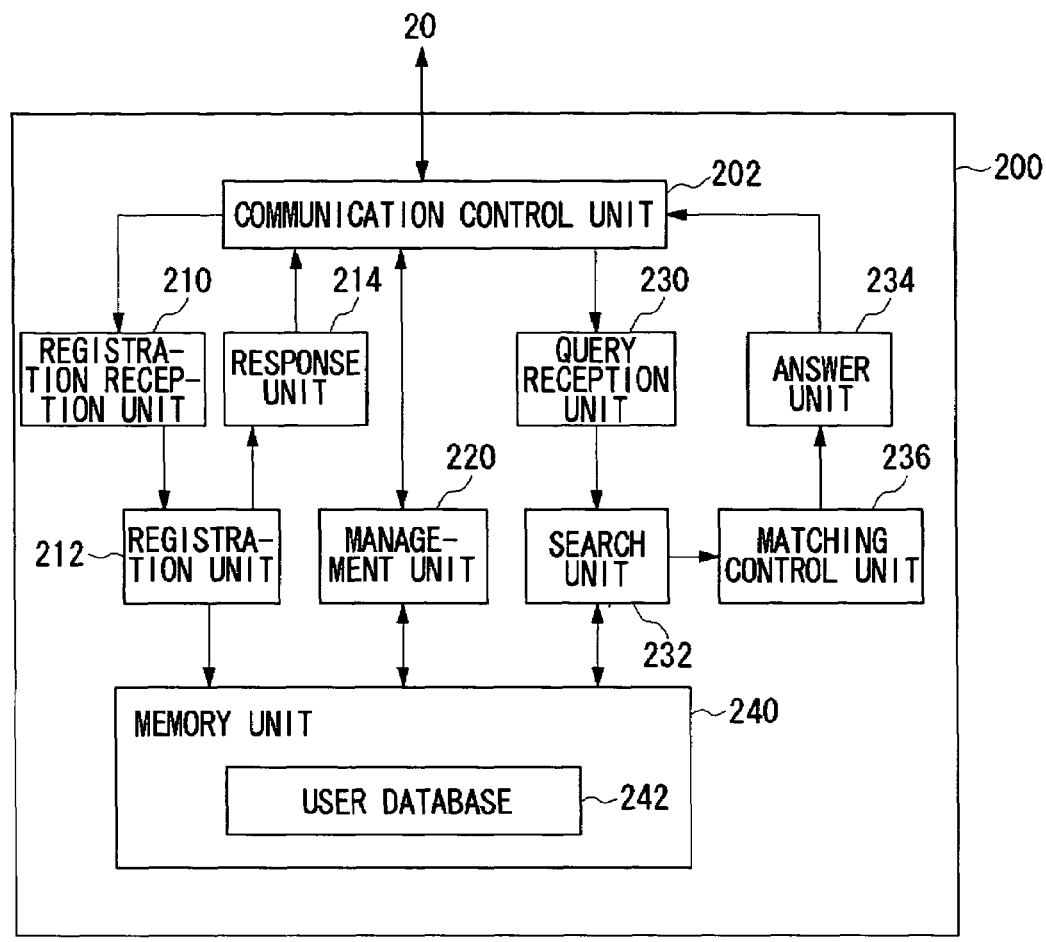
FIG. 12 is a block diagram showing the internal structure of a locator server according to a third embodiment.

FIG. 12 shows the internal structure of a locator server 200 according to this embodiment. The locator server 200 according to this embodiment is provided with a matching control unit 236, in addition to the structure of the locator server 200 according to the first embodiment shown in FIG. 6. The other structure is the same as that of the first embodiment, and the same reference numbers are used for the same structure. Difference from the first embodiment will be mainly described in what follows.

FIG. 13 shows an example of internal data of a user database 242 according to this embodiment. The user database 242 according to this embodiment is provided with a media ID field 406, a community flag field 410, a nickname field 412, and a network mode field 414, in addition to the internal data of the user database 242 according to the first embodiment shown in FIG. 7. A specific ID given to a recording medium connected to the client terminal 300 is stored in the media ID field 406. Taking a case where the client terminal 300 is a game machine, for example, the media ID suggests a type of a game which a user is playing. Information for distinguishing a type of application which the user is running may be stored instead of the media ID.

Information about whether or not the user requires a communication partner is stored in the community flag field 410. When the user requires the communication partner, information about the user himself/herself, a type of desired communication partner and the like is also stored in the community flag field 410. The information about the type of the communication partner may include, for example, a type of communication application such as a game, a chat, a telephone, and the like, the age of the communication partner, and an attribute such as sex and the like. In the case of the game, the information may include the level of a player and the like. The community flag field 410 may be arbitrarily used by a service provider. Thus, it is possible to construct the system with more flexibility.

The nickname of the user is stored in the nickname field 412. The nickname of the user may be accepted from the user, when the client terminal 300 of the user makes a request to the locator server 200 for registration. When the client terminal 300 memorizes the locator ID of the client terminal 300 of the communication partner, the client terminal 300 correspondingly memorizes the nickname of the user too, so that it is possible to manage the information of the communication partner with the easier and friendlier nickname.

In the network mode field 414, the network state of the client terminal 300, such as information about, for example, whether direct communication is possible or not and the like is stored. This information is used in such a case that, for example, when both of two users who want to play a match against a plurality of players cannot directly communicate with each other, another user from outside who can directly communicate is searched to play the match.

The user database 242 may be further provided with a field, in which information necessary for the matching of the communication partner, such as the attribute of the user and the like, is stored. Personal information such as the attribute of the user and the like may be registered on the locator server 200 in advance, and held in the user database 242.

In accepting registration from the client terminal 300, the registration reception unit 210 receives the media ID of the recording medium connected to the client terminal 300, a request for matching, and the like. The authentication request unit 310 of the client terminal 300 reads the media ID of the recording medium connected to itself, to provide it for the registration reception unit 210. The registration unit 212 stores accepted information in the user database 242. The query reception unit 230 receives a matching request from the client terminal 300. The query reception unit 230 receives requirements such as, for example, a type of game of which the user wants to play a match, a type of application for communication, a request for a type of communication partner, and the like. The search unit 232 searches through the user database 242 for the client terminal 300 of an appropriate user, on the basis of the accepted requirements. The matching control unit 236 matches up the communication partner based on search result. The answer unit 234 replies the matched communication partner to the client terminal 300. Therefore, the user can automatically find out the desired communication partner, and carry out communication with him/her.

The present invention has been described above based on the embodiments. These embodiments are given solely by way of illustration. It will be understood by those skilled in the art that various modified examples may be made of combinations of the foregoing components and processes, and all such modified examples are also intended to fall within the scope of the present invention which is defined by the appended claims.

What is claimed is:

1. A communication management system comprising:
   a terminal of a user;
   an authentication server which is managed by the maker of the terminal and authenticates the terminal; and a management server which is provided separately from the authentication server and manages an IP address which uniquely identifies the terminal on a network, the terminal comprising:

a holding unit which holds a device ID which is fixedly assigned to the terminal in such a manner as to uniquely identify the terminal;

an authentication request unit which reads the device ID from the holding unit, and sends the device ID to the authentication server to make a request for authentication;

a certificate acquisition unit which acquires a certificate, which certifies success in the authentication of the device ID, from the authentication server; and a registration request unit which sends the certificate to the management server, to make a request for registration of the IP address, which is assigned to the own terminal, the authentication server comprising:

an authentication reception unit which acquires the device ID from the terminal and receives the request for the authentication;

a terminal database which holds a device ID unique to the terminal to be authentication;

an authentication unit which authenticates the correctness of the device ID of the terminal by referring to the terminal database;

a certificate issue unit which issues a certificate when succeeding in the authentication of the terminal, an ID issue unit which issues an ID for uniquely identifying the terminal when succeeding in authentication of the terminal; and a communication control unit which transmits the certificate issued by the certificate issue unit and the ID issued by the ID issue unit to the terminal, the management server comprising:

a database which holds the ID issued by the ID issue unit, and the IP address in a manner that they are associated with each other;

a registration reception unit which acquires, from the terminal, the certificate, the ID issued to the terminal by the ID issue unit, and the IP address of the terminal, and receives the request for registration of the IP address of the terminal;

a registration unit which verifies the correctness of the certificate, and registers the ID and the IP address of the terminal in the database when the certificate is confirmed to be correct;

an inquiry reception unit which receives the request for inquiring the IP address of the terminal;

a search unit which searches through the database on the basis of the ID of the terminal as the target of an inquiry, to acquire the IP address of the terminal;

an answer unit which answers search result;

a user database which stores information related to the user of the terminal; and a matching control unit which controls matching of a communication partner between the terminals, wherein when the inquiry reception unit receives a requirement for the communication partner, the search unit searches through the user database on the basis of the requirement, and the matching control unit determines the communication partner on the basis of search result, and the answer unit answers the communication partner.

2. The communication management system according to claim 1, wherein the holding unit holds the device ID in such a manner that the device ID is un-rewritable from outside.

3. The communication management system according to claim 1, wherein the terminal database stores the device ID assigned by the maker of the terminal to the terminal and acquired from the maker of the terminal.

4. The communication management system according to claim 1, wherein the management server further comprises a group database which holds information related to a group including a plurality of the terminals, wherein the inquiry reception unit receives a request for an inquiry about the group, and the search unit searches through the group database on the basis of the request for the inquiry.

5. The communication management system according to claim 1, wherein the management server is managed by a service provider servicing the terminal.

6. A method for managing communication comprising:

reading a device ID by a terminal of a user, the device ID unique to the terminal and fixedly assigned to the terminal being held in a memory in the terminal;

sending the device ID from the terminal to an authentication server managed by the maker of the terminal and authenticating the terminal;

authenticating the correctness of the device ID by the authentication server by referring to a device database storing the device ID of the terminal to be authenticated;

issuing a certificate for certifying success in authentication of the device ID by the authentication server and an ID for uniquely identifying the terminal, when succeeding in the authentication;

sending the certificate and the ID from the authentication server to the terminal;

sending the certificate, the ID, and an IP address from the terminal to a management server provided separately from the authentication server, the management server managing a network address for uniquely identifying the terminal on a network;

verifying the certificate by the management server;

storing an ID for uniquely identifying the terminal and the IP address in a database by the management server, in a manner that they are associated with each other, when the certificate is confirmed to be correct;

receiving a request for an inquiry about the IP address of the terminal by the management server;

searching through the database on the basis of the ID of the terminal by the management server, to acquire the IP address of the terminal; and answering the IP address by the management server.

7. The method according to claim 6, wherein steps from reading the device ID to storing in the database are automatically carried out without involvement by a user.

8. The method according to claim 6 further comprising:

receiving a requirement for the communication partner by the management server;

searching through a user database storing information related to the user of the terminal, on the basis of the requirement by the management server;

determining the communication partner on the basis of the search result by the management server; and answering the communication partner by the management server.

9. A management server comprising:

a database which holds an ID for uniquely identifying a terminal and an IP address of the terminal in a manner that they are associated with each other, the ID being issued by an authentication server managed by the maker of the terminal and adapted to authenticate the terminal;

a registration reception unit which acquires a certificate from the terminal and receives a request for registration of the IP address of the terminal, the certificate being issued by the authentication server and certifying success in the authentication of a device ID uniquely identifying the terminal and fixedly assigned to the terminal;

a registration unit which verifies the correctness of the certificate, and registers the ID issued by the authentication server to the terminal and the IP address of the terminal in the database, when the certificate is confirmed to be correct;

an inquiry reception unit which receives a request for an inquiry about the network address of the terminal;

a search unit which searches through the database on the basis of the ID of the terminal as the target of the inquiry, to acquire the IP address of the terminal; and an answer unit which answers search result.

10. A method for managing communication comprising:

acquiring a certificate from a terminal, and receiving a request for registering an IP address of the terminal, the certificate being issued by an authentication server, which is managed by the maker of the terminal and authenticates the terminal, to certify success in authentication of a device ID uniquely identifying the terminal and fixedly assigned to the terminal;

verifying the correctness of the certificate, and registering an ID, uniquely identifying the terminal and issued by the authentication server, and the IP address of the terminal in a database, when the certificate is confirmed to be correct;

receiving a request for an inquiry about the IP address of the terminal;

searching through the database on the basis of the ID of the terminal as the target of the inquiry, to acquire the IP address of the terminal; and answering search result.

11. A computer-readable recording medium which stores a program to make a computer carry out:

a function of acquiring a certificate from a terminal, and receiving a request for registering an IP address of the terminal, the certificate being issued by an authentication server, which is managed by the maker of the terminal and authenticates the terminal, to certify success in authentication of a device ID uniquely identifying the terminal and fixedly assigned to the terminal;

a function of verifying the correctness of the certificate, and registering an ID, uniquely identifying the terminal and issued by the authentication server, and the IP address of the terminal in a database, when the certificate is confirmed to be correct;

a function of receiving a request for an inquiry about the IP address of the terminal;

a function of searching through the database on the basis of the ID of the terminal as the target of the inquiry, to acquire the IP address of the terminal; and a function of answering search result.

* * * * *